United States Patent [19]

Scherch

[11] Patent Number: 5,938,520

[45] Date of Patent: Aug. 17, 1999

[54] CONVEYOR FOR SUPPORTING SAUSAGE STRANDS DURING COAGULATION CYCLE, AND METHOD OF RINSING AND DRYING THE SAME

[75] Inventor: Richard P. Scherch, Fort Myers, Fla.

[73] Assignee: Townsend Engineering Company, Des Moines, Iowa

[21] Appl. No.: 08/929,370

[22] Filed: Sep. 15, 1997

Related U.S. Application Data

[63] Continuation-in-part of application No. 08/835,708, Apr. 10, 1997.

[51] Int. Cl.⁶ ................................................. A22C 11/00
[52] U.S. Cl. ............................................ 452/177; 426/277
[58] Field of Search .......................... 452/177, 27, 51; 426/277, 241

[56] References Cited

U.S. PATENT DOCUMENTS

| | | |
|---|---|---|
| 3,821,439 | 6/1974 | Cohly et al. . |
| 4,025,455 | 5/1977 | Shackle . |
| 4,169,818 | 10/1979 | DeMartino . |
| 4,172,055 | 10/1979 | Demartino . |
| 4,339,940 | 7/1982 | MacKay et al. . |
| 4,352,232 | 10/1982 | Winders et al. . |
| 4,401,329 | 8/1983 | Pedroin . |
| 4,404,239 | 9/1983 | Treharne . |
| 4,458,402 | 7/1984 | Evans et al. . |
| 4,525,898 | 7/1985 | Gallion et al. . |
| 5,053,239 | 10/1991 | Vanhatalo et al. . |
| 5,104,349 | 4/1992 | Van Der Dungen ................ 452/51 |
| 5,156,565 | 10/1992 | Jonnard ................................ 452/32 |
| 5,204,121 | 4/1993 | Bucheier et al. . |
| 5,221,228 | 6/1993 | Pedroia . |
| 5,532,014 | 7/1996 | Kobussen et al. . |
| 5,554,401 | 9/1996 | Alexander et al. . |
| 5,759,602 | 6/1998 | Kobussen et al. ................ 426/241 |
| 5,795,605 | 8/1998 | Morgan et al. .................... 426/277 |

FOREIGN PATENT DOCUMENTS

WO 93/12660  7/1993  WIPO .

*Primary Examiner*—Willis Little
*Attorney, Agent, or Firm*—Zarley, McKee, Thomte, Voorhees & Sease

[57] ABSTRACT

A conveyor assembly for moving an extruded strand of sausage from an extruding machine and for coagulating the outer surface of the strand has first and second conveyor elements mounted on a frame. The conveyor asssembly on the frame slopes downwardly from a point of beginning to a first discharge station and thence back to the point of beginning. A brine fluid circuit is disposed on the frame above the conveyor with a plurality of discharge nozzles thereon to spray brine on a strand of sausage moving with the conveyor assembly. The first conveyor element extends from the point of beginning to an intermediate discharge station upstream from the first discharge station. The second conveyor element extends from the immediate discharge station to the first discharge station. The second conveyor element has a plurality of openings therein so that brine fluid can pass therethrough by gravity.

10 Claims, 5 Drawing Sheets

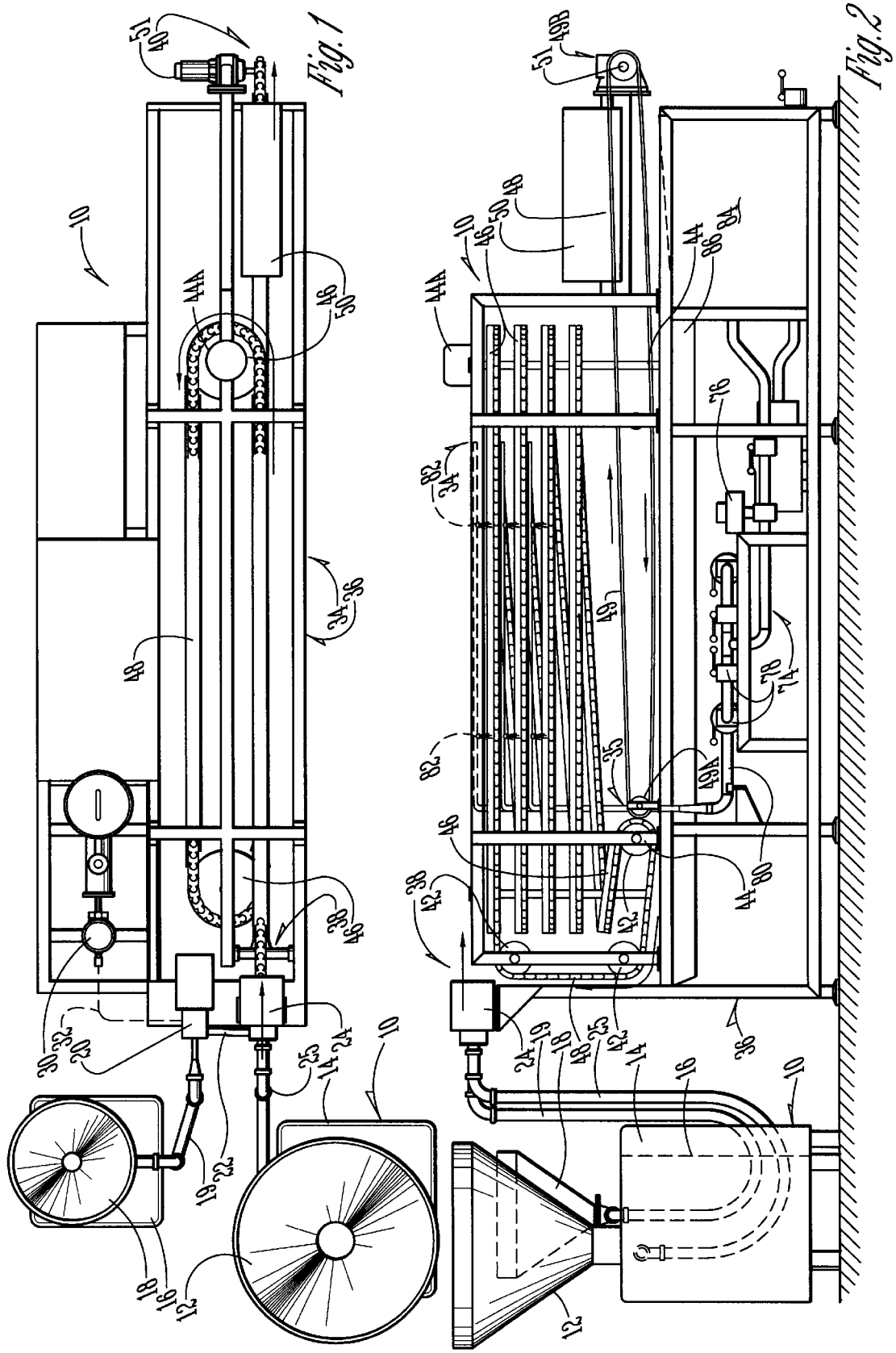

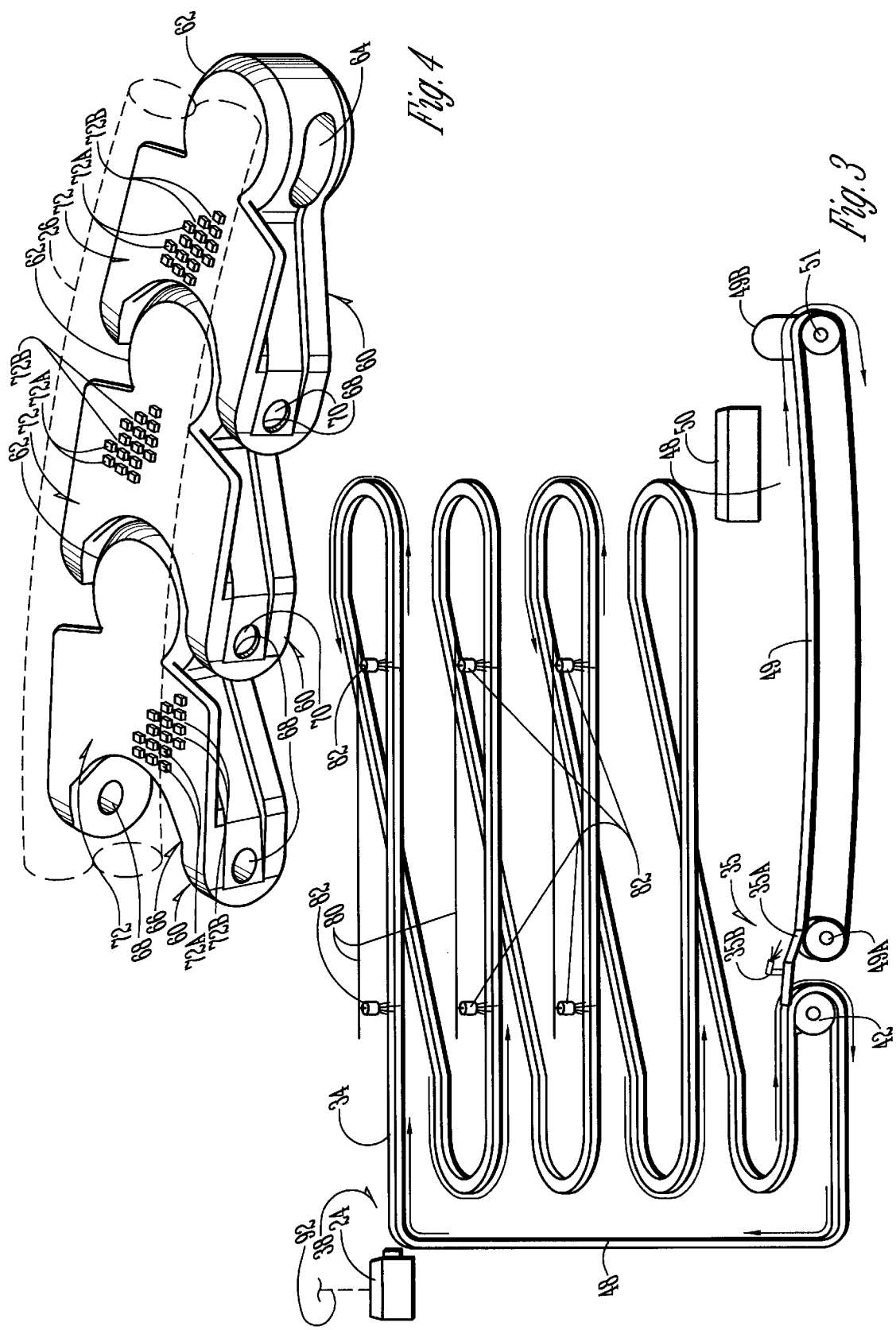

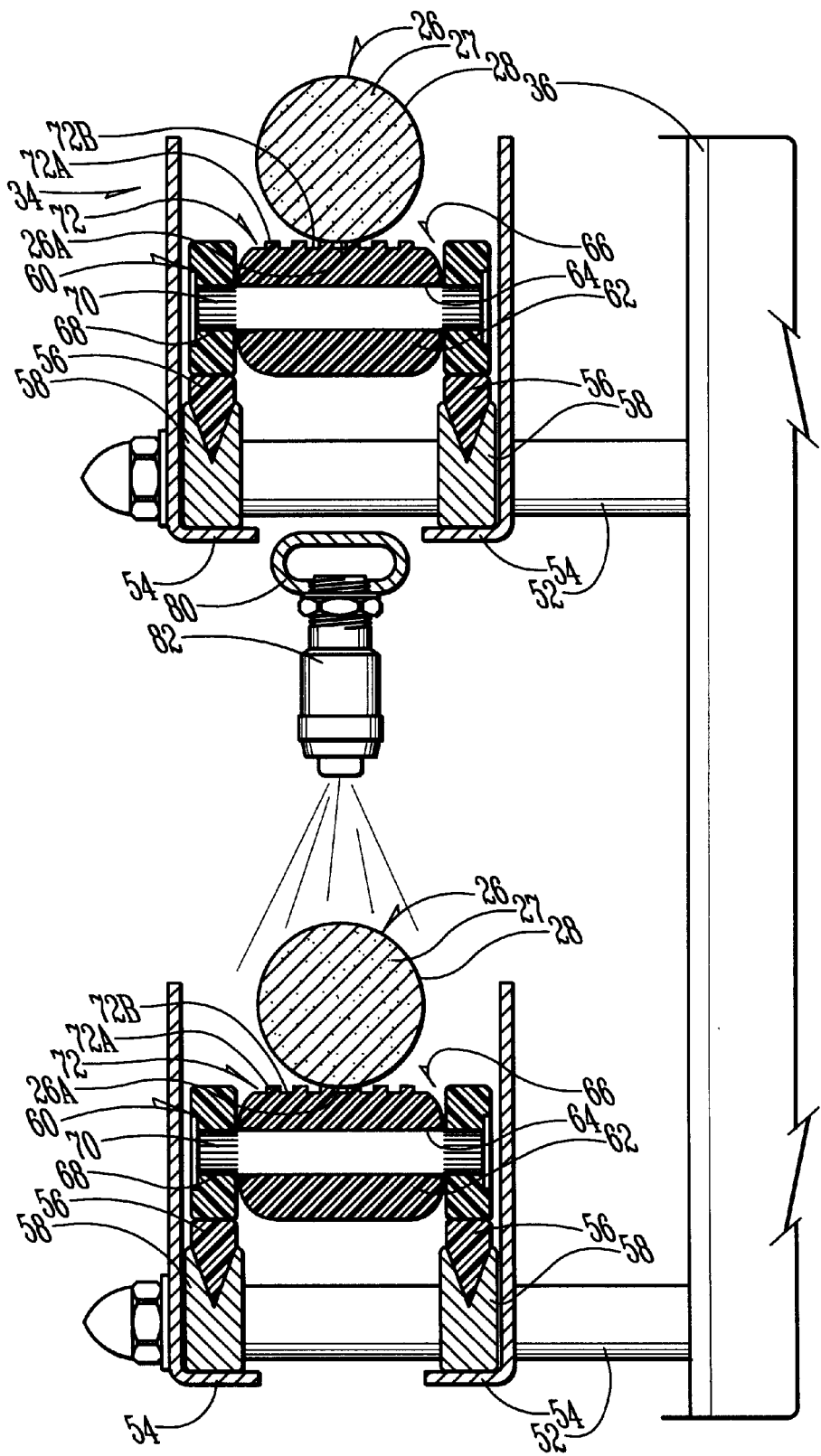

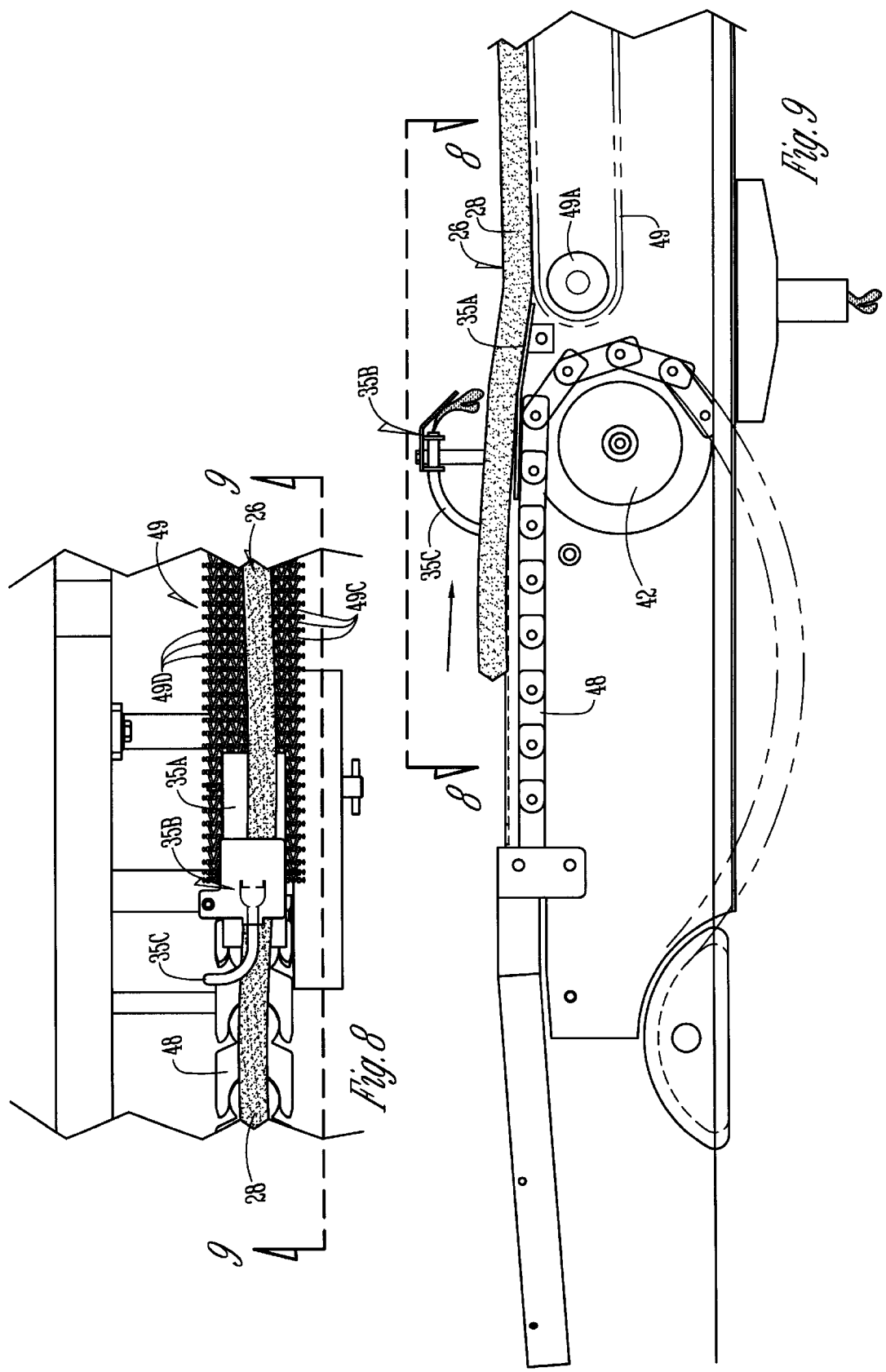

CONVEYOR FOR SUPPORTING SAUSAGE STRANDS DURING COAGULATION CYCLE, AND METHOD OF RINSING AND DRYING THE SAME

CROSS REFERENCE TO RELATED APPLICATION

This application is a continuation-in-part of application Ser. No. 08/835,708 filed Apr. 10, 1997.

BACKGROUND OF THE INVENTION

In recent times, it has become known to coextrude a strand of sausage material which has an inner core of meat emulsion having an outer surface material that can be coagulated to provide an encasement for the strand. The coagulation normally includes subjecting the extruded strand to a brine solution. The brine is applied immediately after the strand is extruded.

The brine is sometimes sprayed onto the sausage strand as the strand is moved along an elongated conveyor which is comprised of a plurality of pivotally interconnected links that have a supporting surface that can retain some of the sprayed brine for treating the sausage strand. One shortcoming of this process is that there is no way to easily remove the residual brine on the sausage strand after the brine treatment has concluded.

It is therefore a principal object of this invention to provide a conveyor for coagulating the outer surface of a sausage strand discharged from a sausage extruding machine wherein the sausage strand will be rinsed with fresh water after it leaves the conveyor to a second conveyor which will not retain any residual fluid.

These and other objects will be apparent to those skilled in the art.

SUMMARY OF THE INVENTION

The sausage strand is extruded onto a belt or conveyor and carried through a brine shower system for about 40 seconds. The brine is sprayed through nozzles onto the sausage while traveling on the belt. The conveyor is comprised of a plurality of links which have a flat supporting surface interrupted by a plurality of spaced protrusions which channels therebetween to permit brine to fill the channels and to engage the bottom surface of the sausage strand supported on the protrusions.

The belt is a Multi-Flex chain made from Acetal plastic. The links are secured with stainless steel pins. Twenty four meters of belt running on four tiers provide the brine shower dwell time that is required. The improvement of this invention is the provision of a second conveyor to receive the brine-treated sausage, wherein the strand is sprayed with fresh water as it moves on to the second conveyor, and the second conveyor is of an open construction to permit drainage of all fluid on the strand to rinse and dry the same.

BRIEF DESCRIPTION OF THE DRAWINGS

FIG. 1 is a plan view of the sausage extruder unit and the associated conveyor;

FIG. 2 is a side elevational view thereof as viewed from the bottom of FIG. 1;

FIG. 3 is a schematic view of the conveyor unit;

FIG. 4 is an enlarged scale perspective view of the conveyor belt;

FIG. 5 an enlarged scale sectional view taken on line 5—5 of FIG. 1;

FIG. 8 is an enlarged scale partial plan view taken on line 8—8 of FIG. 9; and

FIG. 9 is a partial enlarged scale side elevational view taken on line 9—9 of FIG. 8.

DESCRIPTION OF THE PREFERRED EMBODIMENT

Figure 6:
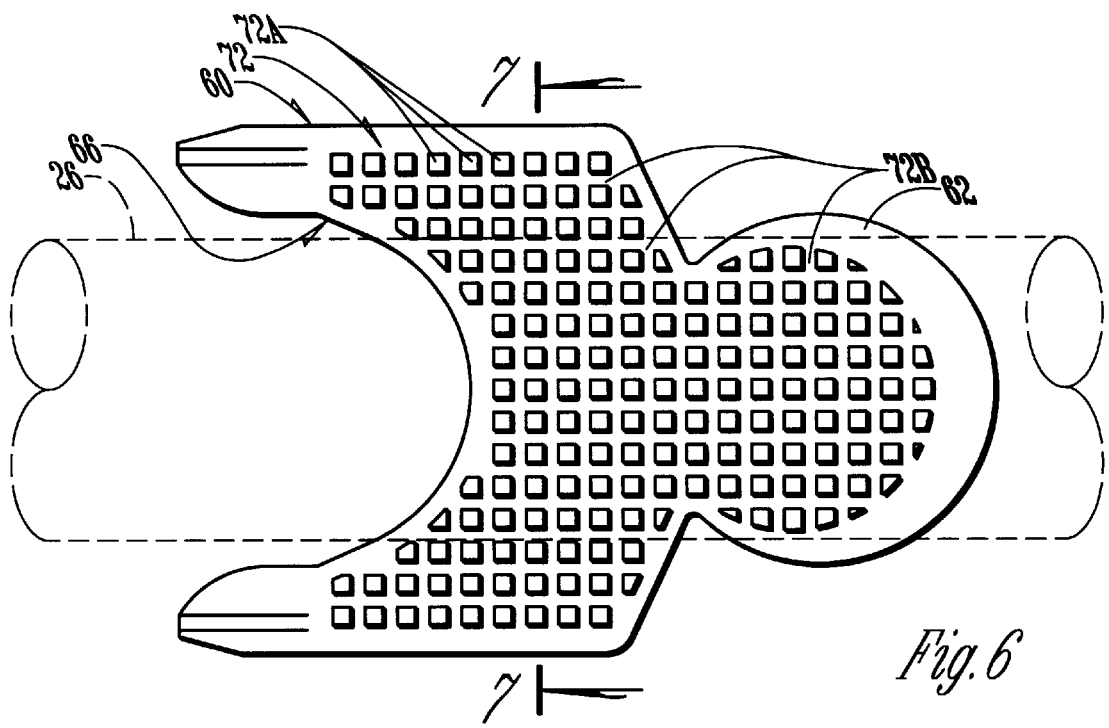
FIG. 6 is an enlarged scale plan view of a conveyor link.
Figure 7:
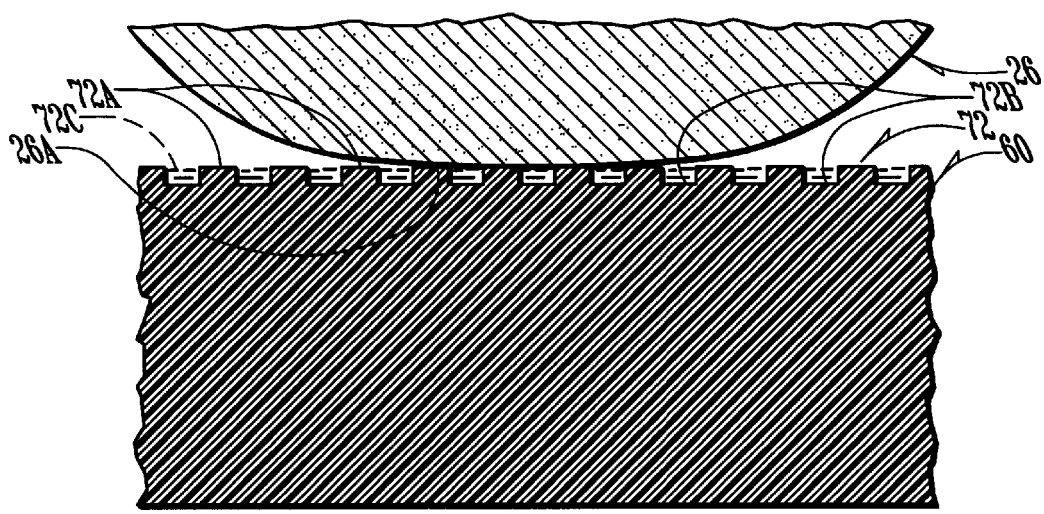
FIG. 7 is a sectional view on line 7—7 of FIG. 6.

The term "sausage" as used herein refers to any type of emulsified meat product that is formed into sausage or frankfurter links or the like.

The numeral 10 designates an existing coextruding machine suitable for the conveyor of this invention. The numeral 12 is a meat emulsion hopper using a meat pump machine 14 for pumping emulsified meat. A collagen gel pump 16 has a hopper 18 for receiving the collagen gel. It is connected by conduit 19 to inline mixer 20. A tube 22 connects the inline mixer 20 to the coextruder 24 which is capable of extruding a cylindrical strand of meat emulsion with a collagen gel material on the outer surface thereof. Coextruder 24 is connected by tube 25 to the meat pump 14. The conventional coextruded strand of sausage 26 (FIGS. 3, 4) has an emulsified meat material core with the collagen gel comprising the outer surface 28 thereof. Liquid smoke from liquid smoke dispenser 30 is used as a coagulation material to coagulate the outer surface 28 of sausage strand 26. The liquid smoke dispenser 30 can be connected in any convenient way such as by line 32 to the inline mixer 20 (FIG. 1).

A conveyor system 34 is mounted on frame 36 and has a point of beginning 38 adjacent the output end of coextruder 24, and a discharge station 40 which is located outwardly and downwardly from the point of beginning 38. Three sprockets 42 are rotatably mounted on frame 36 and are adapted to rotate about a horizontal axis. As best shown in FIG. 2, two of the sprockets 42 are vertically disposed with respect to each other below point of beginning 38, and the third sprocket 42 is located on the outer end of a conveyor system 34 adjacent intermediate discharge station 35.

Two vertical shafts 44 are mounted on opposite ends of frame 36. Each shaft 44 has five rotatably disposed sprockets 46 thereon which are adapted to rotate on shafts 44 about the vertical axis of the shafts. Each set of five sprockets 46 are located in the same parallel plane as one each of the sprockets on the opposite vertical shaft 44. One of the shafts 44 can be driven by motor 44A (FIGS. 1 and 2). An endless conveyor 48 is circuitously mounted on the sprockets 42 and 46.

A second conveyor 49 (FIGS. 8, 9) is rotatably mounted on sprockets 49A and 49B (FIG. 2). Sprocket 49A is adjacent to and below sprocket 42 in intermediate discharge station 35. Conveyor 49 (FIG. 8) is comprised of a plurality of corrugated parallel wires 49C interconnected by pivot rods 49D. It is seen that conveyor system 34 includes conveyors 48 and 49.

At the intermediate discharge station 35, a ramp plate 35A (FIG. 9) is secured to the machine 10 and extends over the conveyor 48 and sprocket 42, and thence extends slightly downwardly towards the top of conveyor 49. A water nozzle 35B is mounted over ramp plate 35A and is connected to a source of fresh water (not shown) by tube 35C to spray fresh water on strand 26.

An infrared heater 50 is mounted on frame 36 adjacent discharge station 40. A drive 51 shaft for the conveyor 49 is located adjacent the discharge station 40 as best shown in FIGS. 1 and 2.

Conveyor 48 (FIG. 5) is disposed between a plurality of elongated L-shaped guides 54 which are secured to frame 36. Elongated rails 56 mounted on bearings 58 extend longitudinally through the guides. With reference to FIG. 4, the conveyor 48 is comprised of a plurality of conveyor segments or links 60 which each have a circular male member 62 at one end thereof with a laterally extending connection slot 64. A semi-circular female slot 66 appears at the end of segment 60 opposite to circular male member 62. Laterally extending apertures 68 extend through the semi-circular female slot 66. Laterally extending pins 70 extend through the aperture 68 and thence through the slot 64 to interconnect the belt segments 60. The apertures 28 permit the segment 60 to pivot about the longitudinal axes of aperture 68, and the slot 64 permits the segments 60 to have limited pivoted movement about a vertical axis passing through the slot 64 so that the conveyor 48 can reverse its direction of travel around sprockets 46. The center portion of each segment 60 is comprised of a flat supporting surface 72 which is in the same plane as the upper surfaces of the circular male member 62 and the body of the segment surrounding the female slots 66. The support surface 72 has a plurality of projections 72A which are preferably aligned in rows to create channels 72B therebetween. The projections 72 are approximately 0.063 in. square, and 0.045 inches high, thus making channels 72B 0.063 in. wide and 0.045 inches deep. A strand 26 one inch in diameter usually will have its lower surface 26A touching 4–6 members 72A and will span 4–6 channels 72B. When the channels 72B are filled with brine, the brine 72C in the channels will engage the bottom surface 26A of sausage strand 26.

With reference to FIG. 2, a brine circuit system 74 includes a brine pump 76. A plurality of miscellaneous control valves 78 are imposed in the brine circuit 74 to selectively control the flow of brine through the system. A fluid line 80 extends from pump 76 and includes a plurality of spaced nozzles 82 which, as discussed hereafter, are located in a plurality of locations on frame 36 directly above the conveyor 48 (see FIG. 5) to dispense a spray of fluid brine on the strand of sausage 26.

Brine circuit 74 includes a brine tank 84 which is connected to a brine collection tray 86 located below the various tiers of conveyor 48, and below conveyor 45.

In operation, the meat emulsion hopper 12 is charged with a supply of meat emulsion, and the collagen hopper 18 is charged with a quantity of collagen gel. Similarly, the liquid smoke dispenser 30 is charged with liquid smoke so that the liquid smoke is combined with the collagen gel within inline mixer 20.

The mixture of liquid smoke and collagen gel is transmitted through tube 22 to coextruder 24 which conventionally discharges the sausage strand 26 with the center core of meat emulsion and an outer surface 28 comprised of the collagen gel and liquid smoke. The liquid smoke is adapted to coagulate the collagen gel in the presence of air and a brine solution. The strand of sausage 26 is discharged from extruder 24 onto the point of beginning of the conveyor 34. The sausage strand progresses along the moving conveyor 48 of the conveyor 34 and is moved under a plurality of the nozzles 82 which spray a quantity of brine on the moving sausage strand. The brine-filled channels 72B help the brine to engage the bottom surface 26A of the strand.

A controller (not shown) coordinates the speed of the rate of discharge of the strand of sausage 26 with the longitudinal movement of the conveyors 48 and 49 as dictated by motor 44A and the conveyor drive 51 so that the elongated strand will not be stretched during its movement.

The infrared heater 50 emits heat to stimulate the coagulation of the outer surface 28 as the sausage strand moves therethrough on the conveyor 48.

The excess brine from nozzles 82 flows downwardly into the brine collection tray 86, and thence into brine tank 84 wherein the excess brine is recirculated through the system.

The controller (not shown) is also adapted to cause the strand of sausage 26 to move from the point of beginning 38 to the intermediate discharge station 35 in approximately 40 seconds to permit the brine sufficient time to coagulate the outer surface 28 of the sausage strand 26.

When the sausage strand reaches the discharge station 40, the outer surface 28 is sufficiently coagulated to provide strength to the sausage strand where it is discharged into any suitable collection receptacle. The sausage strand can also be formed into a plurality of lengths at that location by conventional structure.

When the strand 26 reaches intermediate discharge station 35, it is very moist from the brine solution. It moves over ramp plate 35A (FIG. 9) and underneath fresh water nozzle 35B, and thence onto open wire conveyor 49. The residual brine on the strand is washed away by the fresh water, and all the water thereon flows by gravity from the strand downwardly through the openings between the corrugations in corrugated wire 49C in conveyor 49 for deposit in tray 86.

It is therefore seen that the conveyor system of this invention will achieve at least its principal objectives.

What is claimed is:

1. A conveyor for moving an extruded strand of sausage from an extruding machine, and for coagulating the outer surface of said strand of sausage, comprising, a frame, a conveyor assembly on said frame extending from a point of beginning to a first discharge station, and thence back to said point of beginning, a brine fluid circuit disposed on said frame above said conveyor with a plurality of discharge nozzles thereon to spray brine on a strand of sausage moving with said conveyor assembly, said conveyor assembly being comprised of first and second conveyor elements, said first conveyor element extending from said point of beginning to an intermediate discharge station upstream from said first discharge station, said second conveyor element extending from said intermediate discharge station to said first discharge station to carry a strand of sausage leaving said first conveyor element to said first discharge station, said second conveyor element having a plurality of openings therein so that brine fluid can pass therethrough by gravity.

2. The device of claim 1 wherein said first conveyor element has a construction to retain brine fluid thereon to treat a sausage strand thereon.

3. The device of claim 1 wherein a ramp is secured to said frame to cover said first conveyor element at said intermediate discharge station to facilitate the movement of a sausage strand from said first conveyor element to said second conveyor element.

4. The device of claim 1 wherein a water nozzle is mounted on said frame above said intermediate discharge station so that fresh water can be sprayed on said intended discharge station to rinse a sausage strand passing through said intermediate discharge station.

5. The device of claim 1 wherein said first and second conveyor elements have closely spaced ends at said intermediate discharge station with the end of said second conveyor element being lower than the end of said first conveyor element.

6. The device of claim 1 wherein said second conveyor element is of a woven wire construction having a plurality of openings therein.

7. The device of claim 1 wherein said first and second conveyor elements are of continuous construction.

8. A method of coagulating an extruded strand of sausage from an extruding machine, comprising, moving a strand of sausage on a first conveyor capable of retaining brine fluid to coagulate the surface of said strand, transferring said strand from said first conveyor to a second conveyor which is not capable of retaining fluid to permit any brine fluid on said strand to drain from said strand by gravity.

9. The method of claim 8 wherein fresh water is sprayed on said strand as it moves from said first conveyor to said seconds conveyor.

10. The method of claim 8 comprising the further step of draining fluid from said strand while on said second conveyor through openings in said second conveyor.

* * * * *